UNITED STATES PATENT OFFICE.

FRANCIS A. HALSEY, OF SAN RAFAEL, CALIFORNIA, ASSIGNOR OF ONE-HALF TO WILLIAM C. SAVAGE, OF SAME PLACE.

SMOKELESS POWDER.

SPECIFICATION forming part of Letters Patent No. 596,324, dated December 28, 1897.

Application filed February 19, 1897. Serial No. 624,231. (No specimens.)

*To all whom it may concern:*

Be it known that I, FRANCIS A. HALSEY, a citizen of the United States, residing at San Rafael, county of Marin, State of California, have invented an Improvement in Smokeless Powder; and I hereby declare the following to be a full, clear, and exact description of the same.

My invention relates to improvements in the manufacture of explosive compounds, and especially to that class known as "smokeless gunpowders."

It consists in a composition of ingredients which, while non-explosive separately, will, when combined, produce an explosive with a very small amount of smoke or colored fumes, and which is suitable for use in guns by reason of a low initial or breech pressure and a comparatively high muzzle velocity.

My powder and its manufacture will be more fully described by reference to the following specification.

In the manufacture of my powder I employ a combination of alkaline-metal and alkaline-earth-metal salts, essentially non-explosive in themselves, but capable by their union of producing a suitable powder for use in guns.

The representative and equivalent substances which I employ are potassium or sodium bichromate, barium or strontium nitrate, potassium or sodium permanganate, or potassium pertungstate, or equivalent analogous salts, in conjunction with ammonium picrate and sodium or potassium or analogous silicate. When mixed in the proper proportions and granulated, a powder is made having a hard moisture-resisting grain not easily pulverized or broken up. These substances are mixed in approximately the following proportions: ammonium picrate, fifty per cent.; bichromate of an alkaline metal, such as potassium or sodium, twelve per cent.; nitrate of an alkaline-earth metal, such as barium or strontium, twenty per cent.; five per cent. of sodium or potassium permanganate or potassium pertungstate, wolframate, or analogous permanganate or tungstate, which is easily decomposed when ignited in contact with ammonium picrate, and thirteen per cent. sodium or potassium silicate.

In preparing this powder I first grind or pulverize the ammonium picrate and the barium or other alkaline-earth-metal salt which may be employed into a fine powder. I then dissolve the alkaline bichromate and the permanganate or pertungstate separate in boiling water. The ammonium picrate and potassium bichromate are mixed and the solution of permanganate or pertungstate is added slowly, after which the nitrate of strontium may be added to the mass, and finally the sodium or potassium or other silicate, and the whole thoroughly mixed in any suitable mixing-machine so as to form a stiff paste, which is afterward dried and granulated to suit the conditions under which it is to be used.

It will be understood that the proportions of the materials herein used may be varied without essentially altering the character of the composition.

By the addition of the sodium or potassium or analogous silicate I am enabled to make the grains of powder harder and protect them from crumbling and forming dust, and also protect them from the action of moisture to which the powder may be exposed.

I have here described one method of mixing the ingredients which I have found to be satisfactory; but I do not limit myself to this particular method, as the ingredients may be mixed in other ways and the resultant powder be the same.

I have also mentioned various alkaline-metal chromates or bichromates, alkaline-earth-metal nitrates, alkaline-metal silicates, and alkaline-metal permanganates or pertungstates, and in so wording my claim as to avoid objectionable alternatives I wish it to be understood that the particular salts therein mentioned are representative of the other equivalent salts.

A powder thus compounded may be used wherever an explosive is necessary; but in the proportions herein described it is particularly designed for use in guns. This compound is exploded in the usual way by the use of fulminates in the form of primers applied to the shells containing the powder or by the use of "caps," so called, when used in blasting or other large operations.

Having thus described my invention, what I claim as new, and desire to secure by Letters Patent, is—

A compound consisting of an alkaline-metal chromate, an alkaline-earth-metal nitrate, ammonium picrate, an alkaline-metal permanganate and an alkaline-metal silicate.

In witness whereof I have hreunto set my hand.

FRANCIS A. HALSEY.

Witnesses:
S. H. NOURSE,
JESSIE C. BRODIE.